United States Patent [19]

Nielsen et al.

[11] 4,036,381
[45] July 19, 1977

[54] APPARATUS FOR TRANSFERRING SAMPLE HOLDERS RELATIVE TO A MOVABLE MAGAZINE

[75] Inventors: Thomas Christian Nielsen, Endwell; James Louis Sirico, Vestal, both of N.Y.

[73] Assignee: International Business Machines Corporation, Armonk, N.Y.

[21] Appl. No.: 610,723

[22] Filed: Sept. 5, 1975

[51] Int. Cl.² ............................................... B07C 5/36
[52] U.S. Cl. ................................... 214/310; 214/16 B; 214/16.4 R
[58] Field of Search ..................... 214/16 B, 309, 310, 214/16.4 R; 198/734, 739

[56] References Cited

U.S. PATENT DOCUMENTS

| | | | |
|---|---|---|---|
| 2,386,520 | 10/1945 | Watson et al. | 214/16.4 A |
| 2,954,882 | 10/1960 | Dailey | 214/16.4 R |
| 3,038,078 | 6/1962 | Kern | 214/16.4 R X |
| 3,115,966 | 12/1963 | Leiter | 198/103 |
| 3,722,719 | 3/1973 | Frank | 214/310 |
| 3,819,088 | 6/1974 | Guigan | 221/224 |
| 3,902,773 | 9/1975 | Gondek | 214/16.4 R |
| 3,985,507 | 10/1976 | Litz et al. | 23/253 R |

*Primary Examiner*—Robert J. Spar
*Assistant Examiner*—R. B. Johnson

*Attorney, Agent, or Firm*—Norman R. Bardales

[57] ABSTRACT

Plural sample container holders, each of which is capable of carrying a plurality of sample containers, are carried in a box-like magazine. The sample handling system, has an incrementably operable first conveyor that conveys the loaded magazines. Intersecting the first conveyor at a given location is a second incrementably operable conveyor which is adapted to access, i.e. withdraw and insert holders, through an access of the magazine and to convey withdrawn holders to and from a sample work station and back to the given location. The second conveyor carries a protruding member which co-acts with a cooperative engageable member carried by each holder. When the holders are being carried by the magazine, their respective cooperative engageable members are in alignment, the magazine being adapted to expose the so aligned cooperative members of the holders. This provides the holder-loaded magazine to be in a non-obstructing relationship with the protruding member means when the latter is at rest in its home position at the given location while the magazine is being conveyed by the first conveyor about the given location. Registration means are also disclosed which keep the loaded magazine while being conveyed by the first conveyor in a predetermined registration so as to further enhance the maintainability of the aforementioned non-obstructing relationship.

6 Claims, 5 Drawing Figures

APPARATUS FOR TRANSFERRING SAMPLE HOLDERS RELATIVE TO A MOVABLE MAGAZINE

CROSS-REFERENCE TO OTHER APPLICATION

The present invention is directed to certain aspects of the handling system described in a co-pending patent application, Ser. No. 610,701, filed concurrently herewith, U.S. Pat. No. 3,985,507, issued Oct. 12, 1976, entitled "Automatic Test Sampling Handling System" of F. A. Litz, E. S. Mathisen, P. A. Schumann, Jr., and C. R. Valentino, and assigned to the common assignee herein.

BACKGROUND OF THE INVENTION

1. Field of the Invention

This invention relates to article handling systems employing article holders and cooperative article holder magazines.

2. Prior Art

The handling of articles on a partially or fully automated basis has been employed in parts assembly and/or inspection systems, parts and/or document retrieval and/or storage systems, etc. One such system where the handling of articles on a reliable and efficient basis is desirable is the handling of test samples to be tested.

For example, there currently exists a wide variety of analytical instruments that use test probes for detecting some characteristic associated with a test sample and providing an electrical analog signal proportional to the characteristic. A specific example is a spectrophotometer having a fiber optic light system designed to project light onto or through a sample and measure the reflectance or transmittance thereof across a spectrum of different or discrete wavelengths.

In the past, many such instruments were designed to have an initial test sample manually prepared and handled so as to be presented to the test probe. More recently, there has been a trend to providing automatic sample handling systems which are capable of handling a plurality or multiplicity of test samples in which the samples have been previously prepared for analysis. In such systems, the automatic sample handling allows the various tests to be made at a relatively high throughput rate. Some of these systems include some form of a program controlled digitial electronic controller that controls the operation of a transport mechanism having some form of stepping motors that selectively move the samples through the test station.

While such instruments are capable of testing a wide variety of materials, the instruments find multiple applications for analyzing liquid samples in which the sample is contained within a test tube. Generally, testing procedures associated with such liquid samples involve two phases, the sample preparation phase and the actual testing. A more specific example to illustrate both phases deals with the use of colorimetric reagents to detect or measure the concentration of a substance within the liquid. Here, the sample preparation includes adding the reagent to the sample. After the reagent has sufficient time to react with the sample and reach a stable level, the resultant test sample is then analyzed by a spectrophotometer to determine the color characteristics thereof. These color characteristics are proportional to the concentration of the substance being analyzed. Analyses and tests of this nature are well known and described within the current literature. See for example, "Instrumental Methods of Analysis", Fifth Edition, by H. H. Willard et al, published by D. Van-Nostrand Co., New York. An example of an automatic spectrophotometric sample system is disclosed in U.S. Pat. No. 3,704,953 — Carter et al. Examples of automatic test tube transport or handling systems are disclosed in U.S. Pat. No. 3,687,632 — Natelson and 3,768,526 — Sanz et al.

An example of a spectrophotometer system using a fiber optic probe is described in the copending patent application entitled "Self-Calibratable Spectrum Analyzer", R. N. Jackson, R. W. Kern and A. H. Tong, Ser. No. 587,459, filed June 16, 1975, and assigned to the common assignee herein. An example of a gripper mechanism and positioning apparatus for manipulating a fiber optic probe or test tube is described in the copending application entitled "Positioning Apparatus", A. P. Mulzet and J. L. Sirico, a co-inventor herein, Ser. No. 592,584, filed July 2, 1975 and also assigned to the common assignee herein.

SUMMARY OF THE INVENTION

It is an object of the present invention to provide an article handling system which handles the articles in an efficient and reliable manner and with a minimum of operator contact.

It is another object of this invention to provide an article handling system of the aforementioned kind which handles articles that are test sample containers containing test samples to be tested.

It is still another object of this invention to provide an article handling system of the aforementioned kind for handling test sample containers contained in plural container holders which holders in turn are contained in a magazine.

Still another object of this invention is to provide an article handling system of the aforementioned kind, which allows the article container holders to be loaded in a magazine and the loaded magazine to be conveyed, i.e. transported, in a nonobstructing relationship with an article holder transfer means that transfers the article holders relative to the interior of the magazine.

According to one aspect of the invention, there is provided an article handling system for storing, conveying and presenting a plurality of articles to at least one work station. The system includes a plurality of article holders, each of which carries a plural number of articles. At least one magazine is provided for carrying a plural number of the holders. First conveying means are provided to move the magazine along a first path. Second conveying means are provided to move the article holders along a second path. The second conveying means intersects the first path at a predetermined location. The second conveying means is extended adjacent to at least the work station. The first conveyer means is operable to incrementably position the magazine at the location. Article holder transfer means are provided to transfer at the location the article holders relative to the interior of the magazine and to the second conveyor means. The article holder transfer means has protruding member means movable along the second path by the second conveyor means. Each of the article holders has a cooperative member means engageable by the protruding member means. The article holders when carried by the magazine have their respective cooperative member means in substantial alignment. The magazine is adapted so that the aligned cooperative member means are exposed when carrying the article holders.

The protruding member means has an at rest home position at the location at which the protruding member means is in protruding alignment with the aligned cooperative member means. The magazine and the article holders are in non-obstructing relationship with the protruding member means whenever the protruding member means is in the home position and the first conveyor means is operable incrementing the magazine at the location.

According to another aspect of the invention, the article handling system further includes magazine registration means that maintains the magazine and the article holders carried therein in the nonobstructing relationship. The registration means includes cooperatively engageable first and second members associated with the first conveyor means and magazine, respectively.

The foregoing and other objects, features and advantages of the invention will be apparent from the following more particular description of a preferred embodiment of the invention, as illustrated in the accompanying drawing.

BRIEF DESCRIPTION OF THE DRAWING

In the FIGURES, like elements are designated with similar reference numbers.

DESCRIPTION OF THE PREFERRED EMBODIMENT

In the preferred embodiment, the articles to be handled by the inventive system are preferably test sample containers such as test tubes and the like.

Figure 1:
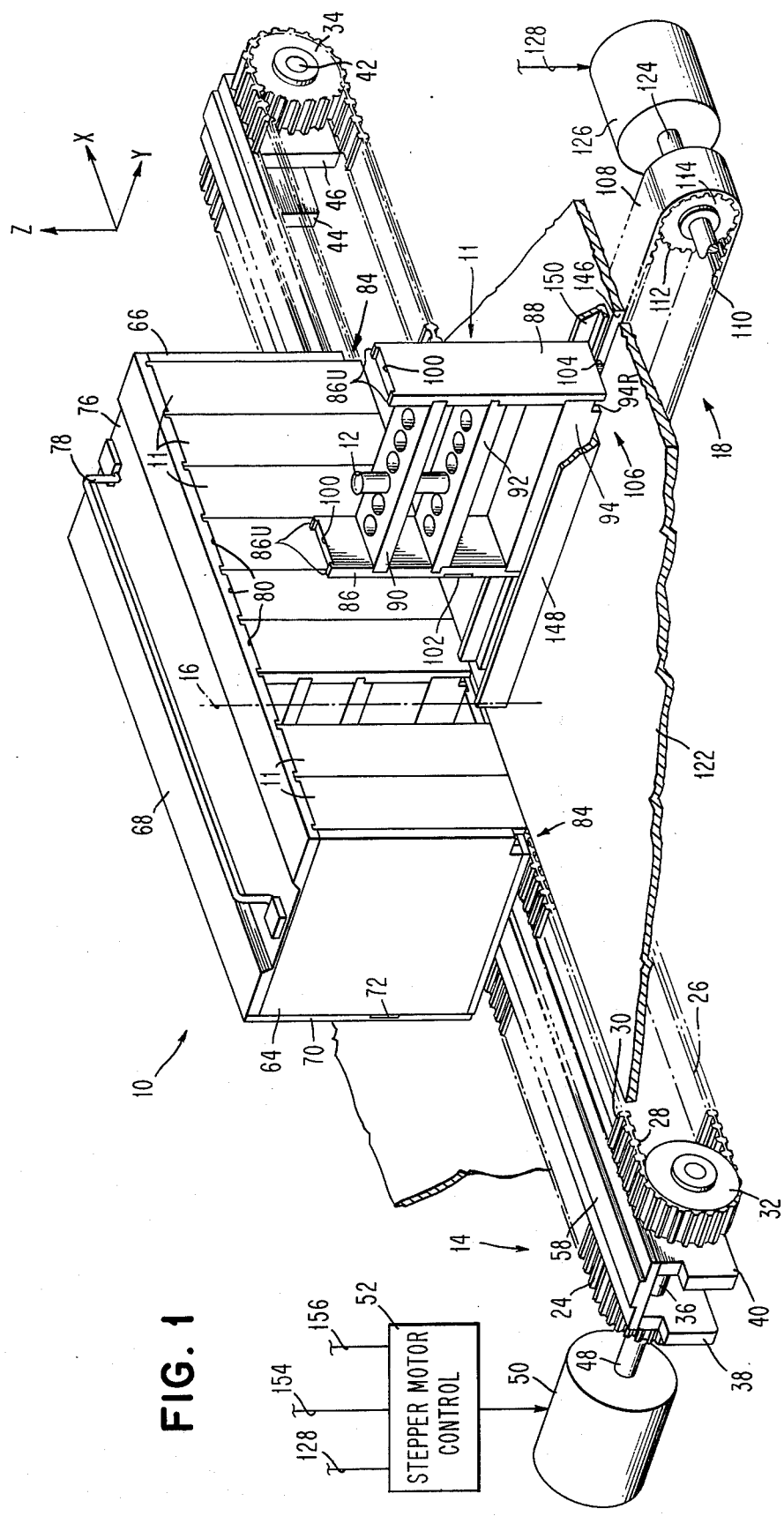
FIG. 1 is a perspective view of a preferred embodiment of the article handling apparatus of the present invention.
Figure 2:
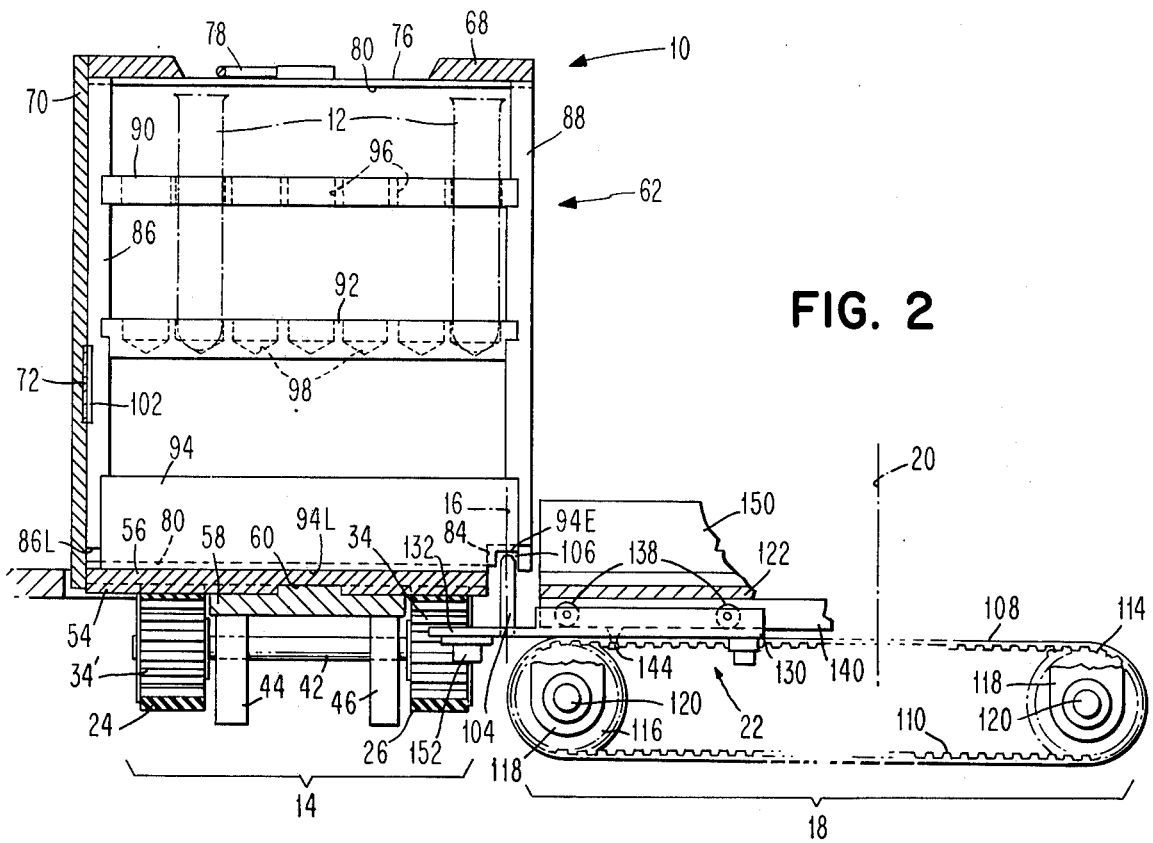
FIG. 2 is a partial cross-sectional view of the preferred embodiment of FIG. 1, and wherein the article transfer means thereof is shown in its home position.

Referring now to FIGS. 1 and 2, the magazine 10 carries a plurality of article holders 11. By way of example, magazine 10 is shown in the FIGURES as being capable of holding nine article holders 11. Each of the article holders carries a plural number, e.g. seven, of test tubes 12, only one of which is shown in the withdrawn article holder 11 illustrated in FIG. 1, for sake of clarity. A first transport or conveying means generally indicated by the reference numeral 14 conveys the magazine 10 in a predetermined orientation along a first path that extends through an article holder transfer station generally indicated by the vertical dash-dot line 16. A second transport or conveying means generally indicated by the reference numeral 18 moves the individual article holders 11 along a second path. Conveying means 18 intersects the first path at a predetermined location at the site of the article holder transfer station 16. Conveying means 18 is extended to at least one work station which, for sake of clarity, is omitted in FIG. 1 and shown schematically as a dash-dot vertical line 20 in FIG. 2. Means 14 is preferably operable to incrementally position magazine 10 at the aforesaid intersecting location at site 16. For this particular application and by way of example, work station 20 is a test station and is adjacent to conveying means 18.

In the general operation of the system, the transport means 14 moves the holder loaded magazine 10 until the desired one of the holders 11 is located at station 16. Then, with transport means 14 stopped, the transport means 18, which carries and article holder transfer means generally indicated by the reference number 22, cf. FIG. 2, is actuated to remove the selected holder 11 from magazine 10. The second conveyor means 18 is also preferably selectively and incrementally operable so that it moves the selected holder along the second path so that one of the selected test tubes 12, which it carries, can be positioned with respect to the work station 20. After the test tube is so positioned, means 18 is stopped and the work, i.e. test, performed on the sample. After the test is accomplished, transport means 18 is again actuated so as to position the next container 12 with respect to station 20, and so on. Upon completion of the work on the samples of the particular holder 11 at work station 20, conveying means 18 is actuated to move the particular holder 11 via transfer means 22 in the reverse direction so that it may be reinserted into the magazine 10. Conveyor means 14 is then actuated to place another selected holder 11 in alignment with the transfer station 16. After all of the desired holders 11 selected to be transferred to the station 20 have been so processed and returned within magazine 10, conveyor means 14 is again actuated so that the loaded magazine 10 is carried away from the station 16. Preferably, the transport means 14 is operated in a unidirectional manner so that magazines 10 may be continuously fed into the system at one end and removed at the other. Alternatively, conveyor means 14 may operate in a bidirectional manner for certain applications so that the magazine 10 can be fed into and removed from conveyor means 10 at the same location or end.

Referring now to FIGS. 1 – 4 in greater detail, conveyor means 14 is preferably a positive drive, synchronously driven twin belt system which has a pair of spaced apart identically configured twin belts 24, 26. Belts 24, 26 are of an elastomeric material and each is configured with inner and outer transverse teeth, cf. for example, inner tooth 28 and outer tooth 30 of belt 26, cf. FIG. 1. For sake of simplicity, the inner and outer teeth of each belt are in alignment with respect to each other and have the same tooth pitch P cf. of FIG. 3. Belt 26 is entrained about a pair of identical toothed belt pulleys or wheels 32, 34, each of which has teeth on its periphery that mate and co-act with the inner teeth of belt 26. In a similar manner, belt 24 is entrained about identical similar corresponding pair of toothed wheels 32', 34', cf. FIGS. 4 and 3, respectively.

Figure 4:
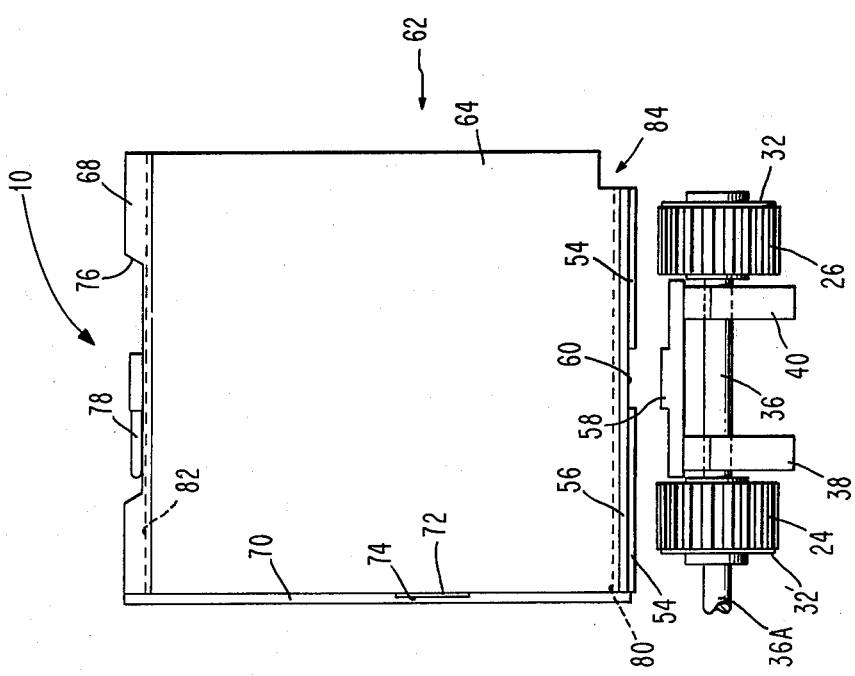
FIG. 4 is an end view of the magazine of FIG. 3.

Wheels 32 and 32' are affixed with their respective teeth in alignment on a common shaft 36 that is journalled in the bearing support blocks 38, 40, which are located in the spacing between the two belts 26, 28, cf. FIGS. 1 and 4. Likewise, at the other end of system 14, wheels 34, 34' are also affixed with their respective teeth in alignment on a common shaft 42, cf. FIG. 2, that is journalled in similarly located blocks 44, 46. Blocks 38, 40, 44, 46 are affixed to a frame assembly, not shown, for sake of clarity. Shaft 36 has an extension 36A, FIG. 4, which is connected to the motor shaft 48, FIG. 1, of a reversible rotary step per motor 50 by a suitable coupler, not shown for sake of clarity. Motor 50 is controlled by schematically shown programmable stepper motor control 52.

Figure 3:
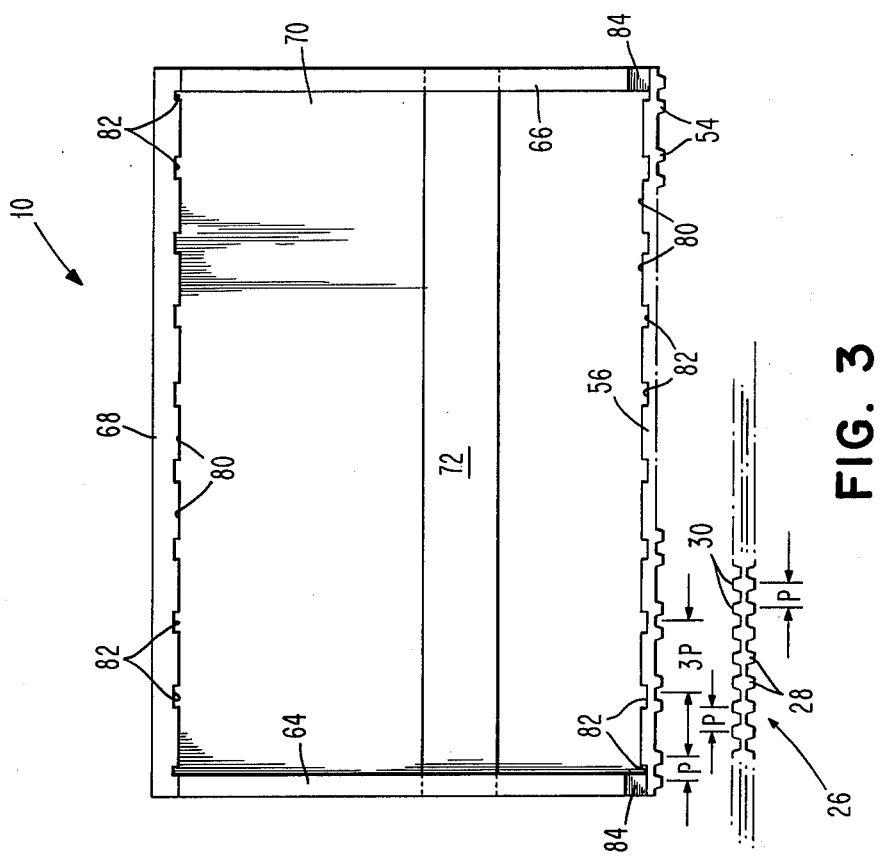
FIG. 3 is a front elevation view of the magazine of FIG. 1 as viewed facing the access side thereof.

The outer teeth, e.g. tooth 30, of belts 24, 26 mate and co-act with the transverse teeth 54 located externally on the bottom side 56 of magazine 10, cf. FIGS. 3 and 4. For sake of explanation and clarity, FIGS. 3 and 4 are partially exploded views in which the magazine 10 is illustrated slightly above the upper reaches of belts 24, 26 to show the interrelationship of the outer belt teeth and magazine teeth. The view of FIG. 3 also illustrates the interrelationship between first and second cooperative registration members 58, 60 that are associated with conveyor means 14 and magazine 10, respectively. In the preferred embodiment, member 58 is configured as inverted T rail or track on which the compatibly contoured recess 60 of magazine 10 is supportedly positioned and guided when being moved by transport means 14.

Magazine 10 preferably has a rectangular box-like configuration with an open access at its side 62 through which the holders 11 are accessed. The magazine 10 in the preferred embodiment is thus oriented on conveyor means 14 with its open side 62 in facing relationship with the transfer station 16. The magazine 10 preferably has five closed sides configured as two end plates 64, 66, bottom and top plates 56, 68, and back plate 70.

An elongated magnetizable strip 72 is positioned in a flush manner in a compatibly contoured recess 74 formed on the inner surface of back plate 70 for purposes hereinafter explained. Another elongated recess 76 is formed on the outer surface of top plate 68 and houses a handle 78 pivotally affixed to it. With the handle 78 in the reclined position, as shown in FIGS. 2 and 4, the magazine 10 is more compact and stable when being stacked and stored with other similar magazines. Formed on the inner surfaces of bottom and top plates 56, 68 are elevated, uniformly-spaced transverse parallel tracks 80 formed between the parallel grooves, e.g. grooves 82. Each track 80 of the upper plate 68 is aligned with one of the tracks 80 of the lower plate 56. Together a so aligned pair of tracks 80 form a guideway used to guide and/or carry a holder 11 in the magazine 10, as hereinafter explained. At each of the lower edges of the access side 62 of magazine 10 a recess or cut-out 84 is provided in each of the end plates 64 and 66 in accordance with the principles of the invention, as hereinafter explained.

Figure 5:
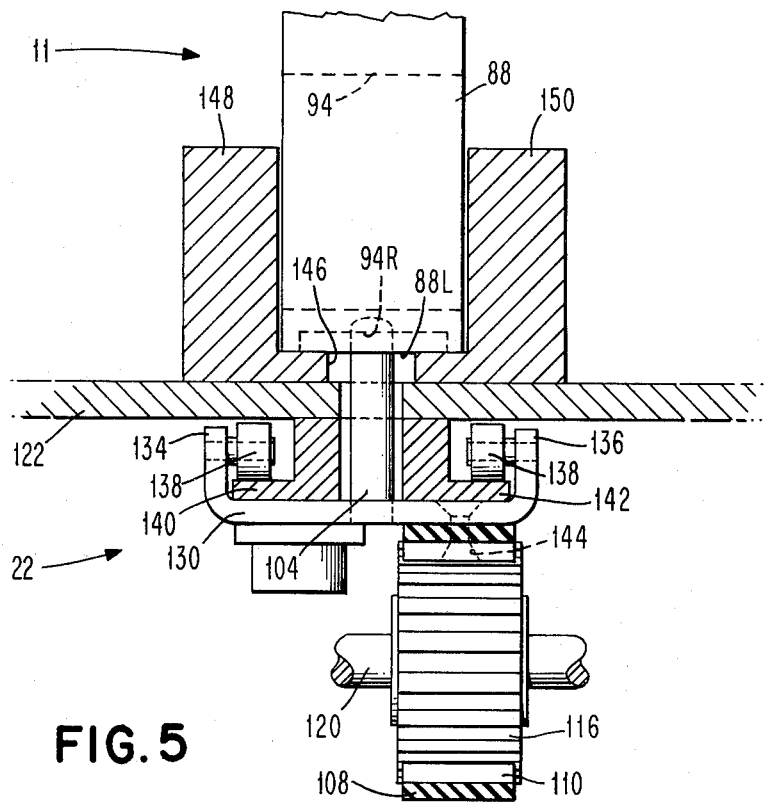
FIG. 5 is an enlarged partially-shown cross-sectional view of the article holder transfer means shown in FIG. 1.

In the preferred embodiment, each of the article holders 11 is configured as a rack-like configuration having a back end vertical member 86 and front end vertical member 88 which are joined by three horizontal parallel cross members 90, 92, 94 affixed thereto, cf. FIGS. 1, 2 and 5. Top member 90 has uniformly-spaced multiple openings 96, each of which is concentrically aligned with one of the countersunk recesses 98 provided in the upper surface of middle member 92. As shown, each aligned pair of opening 96 and recess 98 is capable of holding a test tube container 12 in an upright and stable manner. The lower and more massive member 94 is judiciously positioned to provide the holder 11 with a low center of gravity so as to prevent and/or mitigate tipping of the rack holder 11 in either an empty or container loaded condition.

The remote bottom surfaces 88L and 94L of members 88 and 94, respectively, are substantially coplanar. Formed inwardly from bottom surface 94L is a transverse recess 94R that is compatibly contoured with the cross-sectional configuration of each the lower tracks 80 of magazine 10. For sake of simplicity, the lower edge 86L of member 86, cf. FIG. 2, is terminated with sufficient clearance to avoid being in contact with the associated lower track 80. Formed inwardly from the remote upper edge surfaces 86U and 88U of members 86, 88, respectively, are transverse aligned recesses 100, each of which is compatibly contoured to the cross-sectional configuration of the upper tracks 80 of magazine 10. On the outer face of back member 86, a magnet 102 is mounted in a flush-like manner in a recess provided therein for this purpose. When a holder 11 is loaded in the magazine, its movement in either of the X, Y and Z directions is thus substantially constrained and limited by the co-action of the upper and lower tracks 80 with the appropriate recesses 94R, 100 and/or the magnetic attraction force exerted by the magnet 102 on the magnetizable strip 72 which is in co-alignment therewith. Moreover, when a holder 11 is so loaded, the outer face of its member 88 is substantially co-planar with the surfaces formed by the frontal edges of members 64, 66 and 68 of magazine 10.

Each of the identical holder 11 has a cooperative member means which is engageable by protruding member means 104 of transfer means 22, cf. FIG. 2. In the preferred embodiment, the cooperative member means is a recess 106, cf. FIG. 2, formed between the exposed vertical inner surface of the lower edge of member 88 and the rectangular-like cut-out 94E along the lower front edge of member 94. When magazine 10 is loaded with holders 11, the magazine 10 exposes the aligned recesses 106 via cut-outs 84 which are in a predetermined aligned relationship with the aligned recesses 106 of holders 11, as shown in FIG. 2.

Transport means 18 and article holder transfer means 22 carried thereby is next herein described. In the preferred embodiment, transport means 18 is a positive drive, single belt system having a belt 108 of elastomeric material. The teeth 110 of belt 108 engage mating cooperative teeth 112 of two toothed belt pulleys or wheels 114, 116. Each of the wheels 114, 116 has its respective shafts 120 journalled in a pair of approximate brackets 118, which in turn are affixed to the partially-shown horizontal frame plate 122. Shaft 120 of wheel 114 is connected to the motor shaft 124 of a reversible rotary stepper motor 126 by a suitable coupler, not shown for sake of clarity. Motor 126 is also under the control of the aforementioned programmable stepper motor control 52 via an appropriate interconnection schematically shown multiple-conductor cable 128.

As best seen in FIGS. 2 and 5, holder transfer means 22 has an inverted U-shaped carrier member 130, which has a flat plate-like extension 132. Journalled in the upright portions 134, 136 of member 130 are aligned rollers 138, which are adapted to ride on the shoulders of L-shaped angle rails 140, 142. Rails 140, 142 are affixedly suspended from the bottom of frame plate 122. Member 130 is affixed to the upper surface of belt 108 by a screw or rivet 144. Protruding member 104 is mounted in an upright manner on the extension 132 of member 130 and passes through an elongated slot 146 provided in frame plate 122. In order to mitigate contamination and/or the fouling of the transfer means 22 and/or transport means 18 caused by inadvertent or accidental sample drippings from the holder 11, the vertical portions of rails 140, 142 are mounted in aligned relationship with the respective elongated sides of slot 146 and with their respective horizontal portions pointed away from the slot 146. To furter enhance this contamination prevention, the transport means 18 is located off to one side of slot 146 and not directly under it, as is shown in FIG. 5.

Mounted on the upper side of plate 122 on each side of slot 146 are a pair of L-shaped guides 148, 150 along which the holders 11 are guided when being moved by transfer means 22.

Under quiescent conditions, article transfer means 22 and, hence, protruding member means 104 is in an at-home rest position, as ilustrated in FIG. 2. In this position, member means 104 is in an aligned relationship with the aligned magazine cut-outs 84 and holder recesses 106 for any article holder loaded magazine 10 being carried on transport means 14. As a result, the loaded magazine 10 and protruding member means 104 are, thus, in a non-obstructing relationship so that a loaded magazine and the article holders 11 therein are able to pass freely over the member means 104 in a straddle-like manner.

This non-obstructing relationship is further enhanced by the cooperative registration members 58, 60, which maintain the loaded magazine in fixed registration with the home position of member 104. The member 58 is preferably a separate and stationary rigid member so that it can also slidably support the magazine 10 as it is moved by transport means 14. If desired, the member 58 may have its horizontal arms extended and contoured so as to fit beneath the belts 24, 26 to further enhance support of the magazine. Furthermore, the belt sliding surfaces of the so extended arms may be coated with a low friction material so a solid type bearing. There are, however, other alternative forms such as, for example, would be the case if the twin belt system transport means 14 was configured as a single belt system. In this alternative form, the outer surface of the associated belt can be contoured to have two spaced rows of plural transverse teeth corresponding to the teeth 30 of the twin belt system and an elevated contiguous middle section corresponding to member 58 and located between the two teeth rows. This elevated middle section would likewise be compatibly contoured to fit the recess 60 of magazine 10. In this alternative form, a suitable stationary support or backing plate may be disposed beneath the upper reach of the belt to support the magazine as it is moved by the transport system.

In operation, a loaded magazine 10 is loaded on transport means 14 of FIG. 1 either on the fly, that is, with the motor 50 actuated, or alternatively, with the motor 50 at rest. The magazine 10 is moved to the transfer station 16 by transport means 14 which in turn is being driven by the actuated motor 50. At transfer station 16, the magazine 10 is then incrementally positioned by the transport means 14 so as to place the desired holder 11 in position for removal by the transfer means 22. When so positioned, motor 50 is turned off stopping means 14. The stepper motor 126 of transport means 18 is then actuated causing the protruding member 104 to exert a withdrawal force against the holder 11 which is sufficient to overcome the magnetic attractive force between magnet 102 and strip 72. Thereafter, the transport means 126 incrementally positions the holder 11 so that each of the desired sample or samples is juxtaposed to each of the work stations, only one work station 20 being shown in the preferred embodiment for sake of clarity as aforementioned. After the work is completed on all the samples to be tested in the particular holder 11, the direction of motor 126 is reversed and the holder 11 returned to magazine 10 leaving the protruding motor 104 in the home position and thereby allowing the magazine 10 to be repositioned by transport means 14 so that the next desired holder 11 can be withdrawn.

After all the desired holders 11 have been removed in a predetermined sequence and the samples carried thereby tested at station 20 and thereafter returned to the magazine 10, and with the means 104 in the home position, transport means 14 is actuated to remove the magazine 10 away from the transfer station 16 so that the next loaded magazine can be processed.

Preferably, suitable sensors are juxtaposed along the transport means 14 and 18 to detect when the magazine 10 and holder 11 are at different relative positions thereof. For example, as shown in FIG. 2, transfer means 22 carries an actuator magnet 152 which actuates one or more Hall cells that is or are at known fixed positions relative to the aforementioned home position and/or work station 20. The cell or cells, not shown, in turn generate control signals that are fed to control 52 via schematically-shown multi-conductor cable 154. Similarly, one or more Hall cells can be juxtaposed with respect to transport means 14 and the magazine 10 provided with an actuating magnet, not shown, so as to provide control signals indicative of the relative position of the magazine 10 with respect to a predetermined reference location, e.g. station 16, the lastmentioned control signals being fed to control 52 via multi-conductor cable 156. As is obvious to those skilled in the art, the actuating magnet 152 carried by the transfer means 22 can also actuate a Hall cell, not shown, which is indicative of the protruding member 104 being in the home position.

In the preferred embodiment, the article handling system has a generally horizontal orientation, rectangular configured magazines, side accesses, and a particularly configured article transfer means. As is apparent to those skilled in the art, other modifications, such as for example, inclined or vertical orientations, non-rectangular magazines, one or more differently located accesses such as, for example, a top access, and/or other configurations for the article transfer means may be employed.

Furthermore, it should be understood that end 86 of holder 11 can be configured identical to the other end 88 and both of these ends provided with an appropriate recess or cut-out at its lower edge similar to the recess 10 at its upper edge and which is compatibly contoured to one of the lower tracks 80. This allows the holder 11 to be inserted in and/or removed from the magazine 10 in either direction. Moreover, in certain cases the magazine 10 can have another access side opposite and symmetrically and identical to the access side 62. This would allow the magazine 10 to be loaded from either side with holders of either of the aforedescribed types. If the lastdescribed modified magazine 10 was to, in addition, be loaded with the lastdescribed modified holders 11, then the magazine 10 can be oriented on the transport means 14 with either of its access sides facing the transfer station 16. Alternatively, in the lastdescribed case, an additional holder transport means and article transfer means similar to means 18 and 22, respectively, can be employed on the opposite or remote side of means 14.

Thus, while the invention has been particularly shown and described with reference to a preferred embodiment thereof, it will be understood by those skilled in he art that various changes in form and details may be made therein without departing from the spirit and scope of the invention.

We claim:

1. A sample handling system for storing, conveying and presenting a plurality of sample test tube containers to at least one work station, said system comprising:

a plurality of substantially identical sample container holders, each of said sample container holders carrying a plural number of said sample containers in a predetermined linear array and in an upright manner, at least one six-sided box-like magazine for carrying therein a plural number of said holders, said magazine having top and bottom horizontal closed first and second sides, respectively, two parallel vertical closed third and fourth sides, a vertical closed fifth side extended between said first and second sids and between said third and fourth sides, and a sixth open side configured as an access for accessing said holders, said sixth side being parallel to said fifth side, said holders being aligned in side-by-side relationship with respect to said access when carried by said magazine and having respective predetermined edge portions thereof in proximal alignment with said access, each of said linear arrays being disposed in an orthogonal relationship with said access when said holders are in said side-by-side relationship, first horizontal conveying means for moving said magazine along a first horizontal path, said magazine being conveyed with its bottom side in contacting relationship with said first conveying means and havings its third and fourth vertical sides on a transversely aligned orientation with respect to said first path and its fifth and sixth sides in a parallel aligned orientation with respect to said first path, second horizontal conveying means being operable to selectively and incrementably move said holders along a second horizontal path, said second conveying means intersecting said first path at a predetermined location thereof, and said second conveying means extending adjacent to at least said one work station, said first conveyor means being operable to selectively and incrementably position said magazine at said location, and holder transfer means for transferring at said location said holders through said access relative to the interior of said magazine and to said second conveyor means, said holder transfer means having a protruding member means movable along said second path by said second conveyor means, each of said holders having a cooperative member means disposed in the respective said edge portions thereof and engageable by said protruding member means, said holders when carried by said magazine having their respective cooperative members means in substantial alignment, said bottom second and vertical third and fourth sides of said magazine having aligned recesses to expose said aligned cooperative member means when carrying said holders therein, and said protruding member means having an at rest home position at said location at which the protruding member means is in protruding alignment with said aligned cooperative member means, said recesses of said magazine and said cooperative member means of said holders providing a non-obstructing relationship with said protruding member means whenever said protruding member means is in said home position and said first conveyor means is operably incrementing said magazine at said location.

2. A handling system according to claim 1 further comprising:

registration means to maintain said magazine and said holders carried therein in said nonobstructing relationship, said registration means including cooperatively engageable first and second members associated with said first conveyor means and said bottom side of said magazine, respectively.

3. A handling system according to claim 2 wherein:

said first conveyor means comprises a pair of elongated spaced and parallel first and second horizontal conveyor belts having first and second horizontal coplanar carrier surfaces, respectively, and said first member of said registration means comprises an elevated elongated guide bar means disposed between said spaced first and second belts, and said second member includes an inwardly disposed compatibly contoured channel-like groove means disposed on the exterior of said bottom side of said magazine, said magazine being slidably guided along said groove means by said guide bar means.

4. A handling system according to claim 3 further comprising:

plural rows of parallel teeth carried transversely on said carrier surfaces of said first and second belts, plural rows of corresponding teeth carried transversely on said exterior of said magazine bottom side and being engageable with said teeth carried by said first and second belts, each of said rows of teeth of said magazine having two spaced parts with said channel-like groove means disposed therebetween.

5. A handling system according to claim 1 wherein said magazine further comprises:

plural guideways disposed in the interior of said magazine, each of said guideways being adapted to carry one of said holders therein.

6. A handling system according to claim 1 wherein said holder transfer means further comprises:

carriage means for supporting said protruding means, said carriage means being driven by said second conveyor means.

* * * * *